US005194873A

United States Patent [19]

Sickles, II

[11] Patent Number: 5,194,873

[45] Date of Patent: Mar. 16, 1993

[54] ANTENNA SYSTEM PROVIDING A SPHERICAL RADIATION PATTERN

[75] Inventor: Louis Sickles, II, Cherry Hill, N.J.

[73] Assignee: General Electric Company, Philadelphia, Pa.

[21] Appl. No.: 775,037

[22] Filed: Oct. 11, 1991

[51] Int. Cl.[5] ........................ H01Q 3/02; H04B 7/185

[52] U.S. Cl. ........................ 342/374; 342/354

[58] Field of Search ............... 342/374, 372, 383, 433, 342/434, 354

[56] References Cited

U.S. PATENT DOCUMENTS

| | | | |
|---|---|---|---|
| 3,234,551 | 2/1966 | Giger | 342/354 |
| 3,487,413 | 12/1969 | Shores | 342/374 |
| 3,922,685 | 11/1975 | Opas | 343/854 |
| 4,129,870 | 12/1978 | Toman | 343/106 |
| 4,170,766 | 10/1979 | Pridham et al. | 367/135 |
| 4,599,734 | 7/1986 | Yamamoto | 375/40 |
| 4,626,858 | 12/1986 | Copeland | 342/374 |
| 4,766,438 | 8/1988 | Tang | 342/372 |
| 4,804,963 | 2/1989 | Clapham | 342/195 |
| 4,920,348 | 4/1990 | Baghdady | 342/433 |
| 5,038,149 | 8/1991 | Aubry et al. | 342/372 |

*Primary Examiner*—Gregory C. Issing

*Attorney, Agent, or Firm*—Geoffrey H. Krauss

[57] ABSTRACT

An antenna system provides a substantially spherical radiation pattern about a structure located above ground level, by locating the individual radiation pattern of each of a plurality of individual antennae, each positioned to have a radiation pattern covering only a portion of the desired sphere, and then applying all antenna signals, during either transmission or reception time intervals, through space-diversity and/or time-diversity apparatus, to cause the patterns of all of the antennae to combine into the desired substantially-spherical pattern. The antennae may have substantially hemispherical patterns, with each antenna of a pair thereof being directed in a direction generally opposite to the other antenna of that pair. Time domain multiple access (TDMA) operation of a master system station, with transmission in different time slots for different portions of the coverage sphere, and selection of the strongest received signal from among all of the plurality N of signals simultaneously received by the plurality N of antennae, can provide the desired spherical radiation pattern in both the transmission and reception modes of operation.

16 Claims, 6 Drawing Sheets

ANTENNA SYSTEM PROVIDING A SPHERICAL RADIATION PATTERN

The invention described herein was made in the performance of work under RFP A3-152-JFB-87-008 (MD 87916005) NASA Contract No. NAS 9-18200 and is subject to the provisions of Section 305 of the National Aeronautics and Space Act of 1958 (42 U.S.C. 2457).

The present invention relates to omnidirectional antennae and, more particularly, to a novel antenna system for achieving a true omni-directional, i.e. a substantially spherical, electromagnetic radiation pattern from plural directional antennas.

BACKGROUND OF THE INVENTION

Communications with an object situated well above ground, such as an aircraft or a satellite platform, frequently requires an antenna system providing a true omni-directional electromagnetic radiation pattern, i.e. a substantially spherical pattern with substantially constant gain over $4\pi$ steradians. A spherical pattern is required because of the need to communicate with multiple sites distributed at random locations around the space platform when: (1) it is not feasible to maneuver the antenna or platform to provide the desired antenna pattern; or (2) simultaneous communication with more than one site is required.

While acceptable hemispherical radiation patterns may be achieved from a single antenna element, spherical radiation from a single antenna element is not possible due to unavoidable asymmetry in the antenna feed structure. Realizing spherical coverage from a phased array of antenna elements may be theoretically possible but practical implementations will always result in non-uniform field pattern characteristics (rulls) due to interactions between the radiation patterns of individual elements. Field pattern uniformity further degrades in those cases where individual elements must be separated by multiple wavelengths due to physical constraints, such as might occur when antennas must be mounted on opposite sides of an airplane or satellite, or if wide bandwidths are involved. In practice, obscurations caused by aircraft portions (wings, empennage and the like) or space platform structures (solar power panels, booms and the like) mitigate against spherical coverage and favor an approach using multiple distributed antennas. It is therefore highly desirable to provide an antenna system in which the patterns of a plurality of individual antennae are combined in such a manner as to achieve a substantially uniform spherical radiation pattern about a structure located well above ground level.

BRIEF SUMMARY OF THE INVENTION

In accordance with the invention, an antenna system having a substantially spherical radiation pattern about a structure located above ground level, includes a plurality of individual antennae, each positioned to have a radiation pattern covering only a portion of the desired sphere, and at least one of space-diversity and time-diversity means for combining the patterns of all of the antennae into the substantially-spherical pattern. The antennae may have substantially hemispherical patterns, with each antenna of a pair thereof being directed in a direction opposite to the other antenna of that pair, or may have patterns less than hemispherical, with a greater number of antennae being used. The diversity combination equipment should prevent phased interaction between the plurality of antennae, as by causing radiation from each antenna at a time when none of the other antennae are radiating.

In a presently preferred embodiment, time domain multiple access (TDMA) operation of a master system station, with transmission in different time slots for different portions of the coverage sphere, and selection of the strongest received signal from amongst all of the plurality N of signals simultaneously received by the plurality N of antennae, provides the desired spherical radiation pattern in both the transmission and reception modes of operation.

Accordingly, it is an object of the present invention to provide an antenna system having a substantially spherical radiation pattern.

This and other objects of the present invention will now become apparent to those skilled in the art, upon reading the following detailed description of my presently preferred embodiment, when considered in conjunction with the associated drawings.

FIGS. *2a–2d* are polar radiation pattern plots respectively of an upper hemisphere antenna, a lower hemisphere antenna, the total pattern achieved by phased combination of the two antenna, and the substantially-spherical pattern achieved by time-diversity on transmission and selection of maximum received signal strength during reception;

FIG. *2e* is one possible transmission/reception timing chart for achieving the results of FIG. *2d;*

Figure 4:
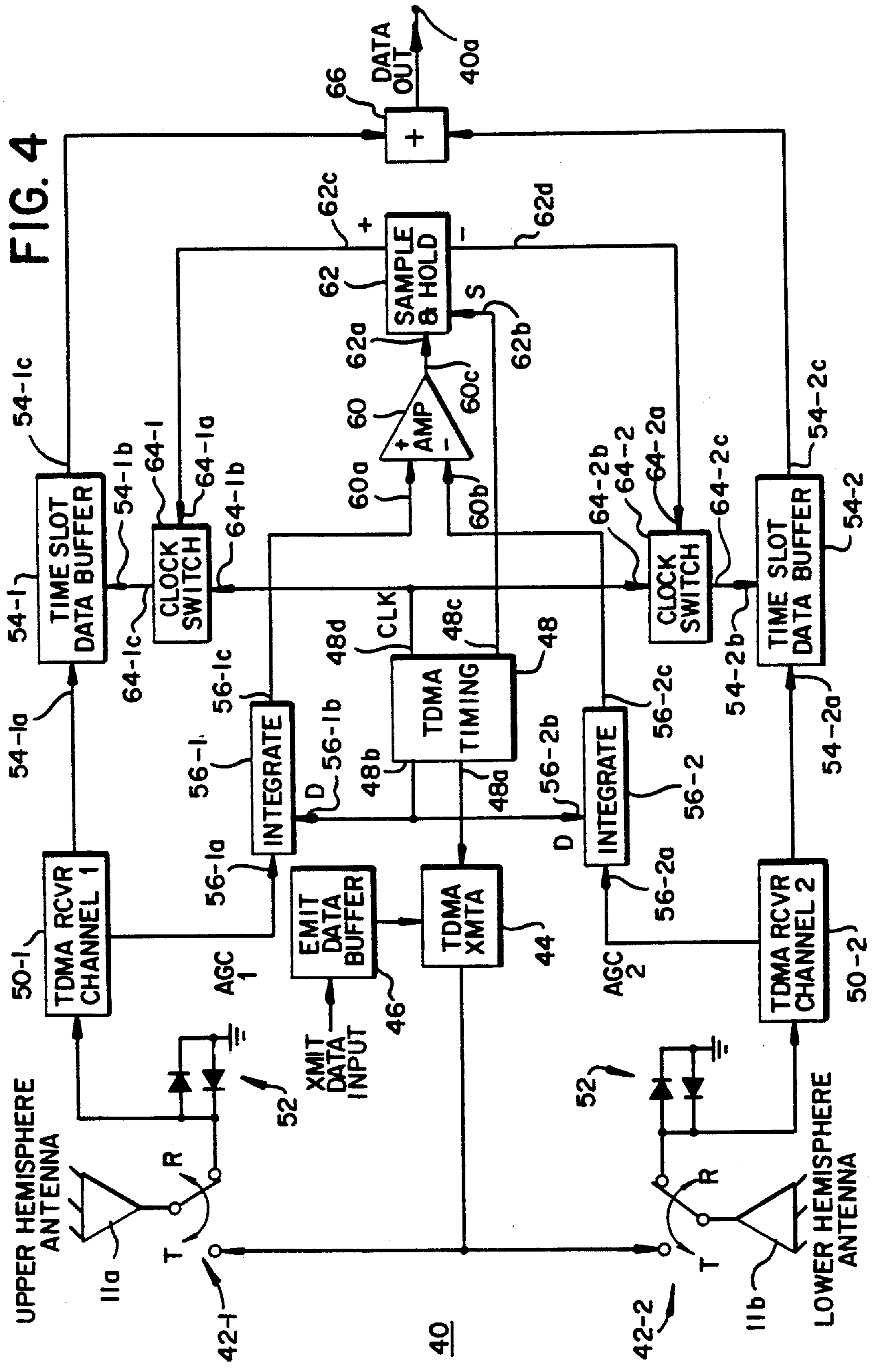

FIGS. *3a* and *3b* are schematic block diagrams respectively of one possible TDMA space-division transmitter and one possible TDMA space-division receiver; and FIG. 4 is a schematic block diagram of a presently preferred data communications system using the spherical antenna system of the present invention.

DETAILED DESCRIPTION OF THE PREFERRED INVENTION EMBODIMENTS

Figure 1:
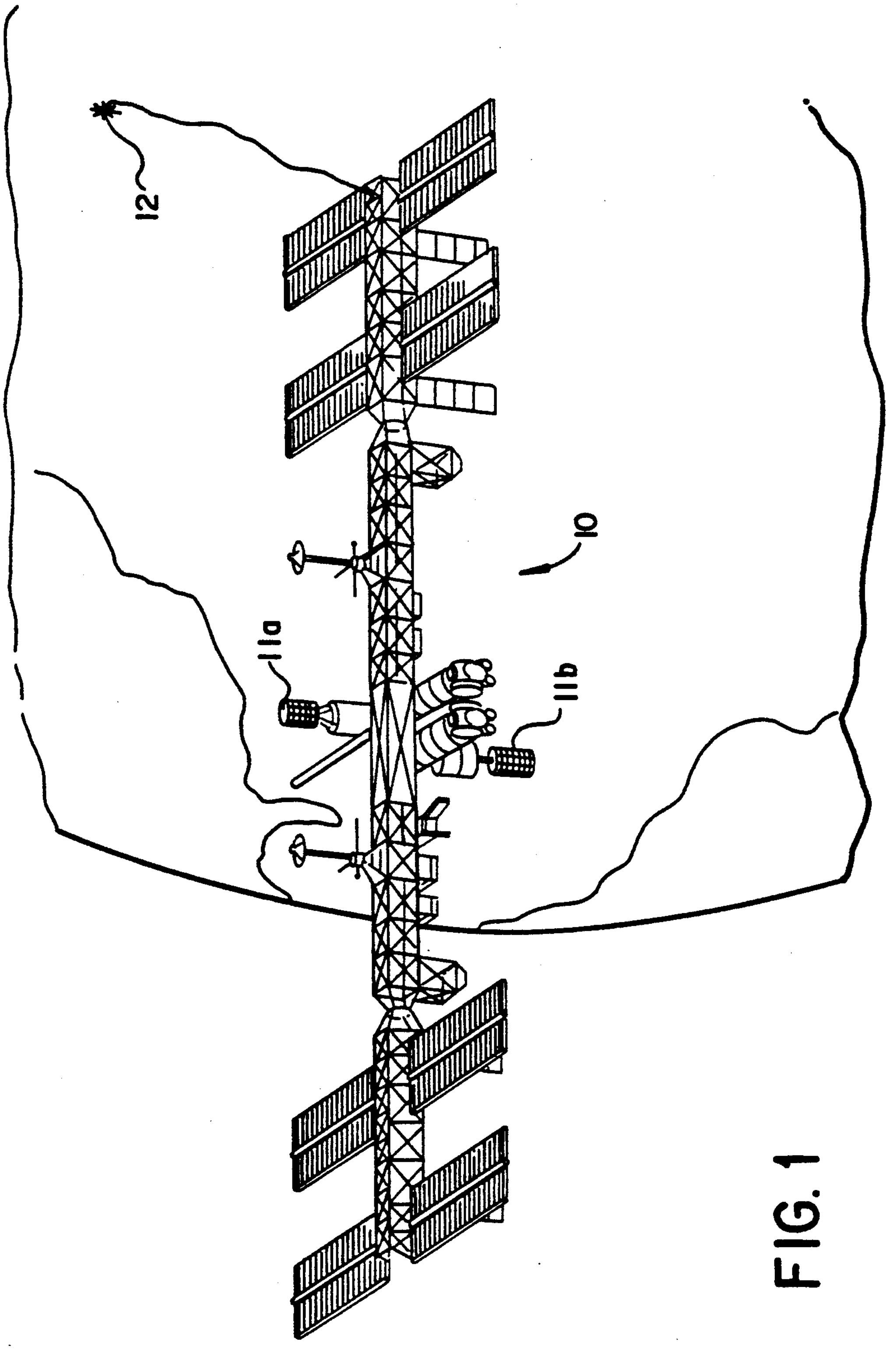
FIG. 1 is a sketch of a proposed Earth-orbital space station, illustrating one possible placement of antennae of a system in accordance with the invention, and of the environment in which a spherical radiation pattern may be advantageously utilized.

Referring initially to FIG. 1, the proposed NASA space station Freedom is one possible platform 10 located above earth ground level and requiring a communications system utilizing an antenna system 11 with a substantially spherical radiation pattern, i.e. a pattern covering an angle of $4\pi$ steradians with substantially constant gain, so that (simultaneous) data and voice communications can be maintained with sources located anywhere in the platform's immediate volume, such as a crew member 12 engaged in extravehicular activity (EVA), an approaching Space Shuttle and the like. The omni-directional antenna system 11 comprises at least two antenna elements 11*a* and 11*b* with each antenna positioned such that the sum radiation pattern, excluding effects of interaction, is essentially spherical. More than two antennae may be utilized, with each antenna preferrably having less than a hemisperical pattern, and with each antenna so positioned as to allow its pattern to be summed with the patterns of all the other antennae to provide the desired spherical pattern. As illustrated, N=2 and each of the single pair of antennae 11*a* and 11*b* are positioned adjacent to, and affixed at, opposite sides of the platform 10 from the other antenna of that pair, and with each antenna having a substantially hemispherical radiation pattern with an axis directed radially away from the axis of the substantially-hemispherical radiation pattern of the opposing antenna of the pair.

Referring now to FIGS. *2a–2d*, the radiation pattern 14*a* of the first antenna 11*a* of an antenna pair is substantially uniform over a hemispherical domain (FIG. *2a*) above a defined plane, e.g. with the antenna 11*a* vertically disposed and directed at 90° above the horizontal plane defined through the 0°–180° axis, the radiation pattern 14*a* has a substantially uniform gain in the volume above that horizontal plane. Similarly, the radiation pattern 14*b* of the second antenna 11*a* of the same antenna pair is substantially uniform over a complementary hemispherical domain (FIG. *2b*) below the same defined plane, e.g. with the antenna 11*b* also vertically disposed and directed at 270° with respect to the same reference as in FIG. *2a*, that is, at 90° below the horizontal plane defined through the 0°–180° axis, the radiation pattern 14*b* has a substantially uniform gain in the volume below that horizontal plane.

If the two antennae 11*a* and 11*b* are axially aligned and simultaneously driven by a common signal, a multi-lobular phased-array pattern 16 (FIG. *2c*) may result; the exact form of pattern 16 will depend upon the phase difference and amplitude split of RF energy between antenna 11*a* and antenna 11*b*. It will be seen that, even for an ideal sharing of energy, and with adjustable phasing between antennae, the pattern 16 has at least one null 16*n* and is not a substantially uniform spherical pattern. Simultaneous actuation of the different antennae is thus not part of my invention.

In accordance with one aspect of my present invention, RF energy from a transmitter is fed to only one antenna of a pair of antennae at any one moment. The antenna pairs are thus separately coupled in Time-Division Multiplex Access (TDMA) service and the receiving station(s) caused to act only upon a stronger signal, to generate a resulting radiation pattern 18 which is substantially spherical. Thus, the antenna elements are disposed such that the resultant field strength pattern of the sum of all elements taken individually and independently approaches spherical, with the array minimum gain $G_m$ in a smallest-gain-direction, e.g. through the horizontal plane, being substantially the same, within a predetermined factor (say, 1 dB), as the array maximum gain $G_M$ in a greatest-gain-direction, e.g. through the vertical plane. Because of the nature of the TDMA processing used, the location, number and detailed characteristics of each antenna element are not critical to achieving the desired spherical pattern. Furthermore, the spherical antenna characteristic is not affected by wide bandwidth operation. The omni-directional antenna transmission operation relies on transmitting all information to be transmitted from each antenna element, separately and in non-time-overlapping manner, such that the radiating electromagnetic fields from each element do not interact but when taken in combination uniformly illuminate the volume around the platform 10.

FIG. *2e* is a timing chart of a TDMA system implementing the spherical coverage pattern. There are a plurality F of frames of information sent each second, with each frame separated into a plurality S of non-overlapping slots, each 1/(FS) seconds long. For example, in the F-th frame and the illustrated case of two antennae, slot assignments can be sequentially arranged for the burst transmission in the first slot (time interval I1) of a first group of data from the first, i.e. upper hemisphere, antenna of a system master station, followed by the transmission of the identical first burst group of data from the complementary second, i.e. lower hemisphere, master station antenna, in the time interval I2 of the second slot. A second burst group of data can be sent from the system master station in subsequent slots, e.g. from the upper hemisphere antenna 11*a* during the third slot (time interval I3) and then from the lower hemisphere antenna 11*b* in the fourth slot of time interval I4. The number of slots allocated for initial transmission from the master station to all other system stations can be varied in accordance with the system requirements, as long as each antenna of a complementary set (e.g. a pair of antennae having complementary hemispherical patterns, or N antennae each having one of N different patterns pointing in a selected direction to provide substantially uniform spherical coverage) is separately driven by an associated one of the N repetitions of each data burst group, and each group N-repetition is sent in its order in the total message. All other stations in the system, except for the single master station, are enabled to be in the reception mode during master station transmission, so that each non-master station receives all the transmitted data during the master transmission Tx intervals (I1–I4); a distant radio receiver would receive up to N repeats of the information depending on how distant that receiver was from the master station transmitter, and the receiver angular position relative to the transmitter. These repeated messages can be processed by any one of the many known standard methods of diversity combining or message selection with diversity combining providing the advantages of improved performance in a fading environment.

The distant station will return data to the master station by transmission back during pairs of time slots (e.g. in intervals I5 and I6) when the master station is in the reception Rx mode. Each distant station may be assigned a priority number and may be set to transmit during that subsequent time slot matching its priority, in well-known TDMA fashion. The distant station may, but illustratively does not, repeat its message; each distant station may be given, as shown, a plurality of time slots within which to send its data. At the master station, the distant station signal is received by all N different antennae, and is processed to extract that received signal having the most favorable characteristics, i.e. best signal-to-noise ratio and the like, to obtain lowest BER.

FIG. *3a* is a block diagram of one possible master station transmitter 20, providing an associated one of N identical RF signals sequentially to each different one of the N sphere-segment antenna AT1–ATn of the system. The input information may be any suitable waveform $I_{in}$ which is applied to transmitter data input 20*a* during a time interval from time $t_0$ to time $t_0'$. The input signal $I_{in}$ is applied to a time compressor means 22 which generates N replica signals of the original waveform, with each waveform $I_{in}$, being speeded up in time by a factor of N; thus in the time interval $t_0'$ to $t_0''$, there are N waveforms $I_{in}$, each identical to the input waveform, but compressed to only 1/N-th of its duration. Those skilled in the art will recognize that means 22 can be provided by digital storage memory which receives the input data (directly, if digital, or via a suitable analog-to-digital converter, if analog) and, via clock and control signals furnished by a station master controller (e.g. means 48 shown in FIG. 4) operates under internal control of means for scanning through a range of addresses, and by use of a count-to-N counter means and logic gating, to provide the N output repetitions; a suitable digital-to-analog converter may be used if a set of analog output signals $I_{in}$, are to be provided. The N repetitions are applied to the data input 24*a* of a suitable RF modulation means 24, receiving the RF carrier at a RF input 24*b*; the modulated carrier at output 24*c* has the desired RF signal characteristics for transmission, with the input data being reproduced N time in sequence on the RF carrier. After amplification, if desired, in a RF amplifier means 26, the signal is provided to the single RF input 28*a* of a 1×N space-division switch means 28; using the same clock and control signals sent to the time compressor means 22, and used to establish each of the N compressed signals in one of the sequential transmission time slots, the switch means routes each time-compressed input replica-modulated RF carrier burst to an associated spatially-separated antenna ATi. It will be understood that means 28 need be nothing more than a single-pole, N-throw RF switch which is controlled to connect to the first antenna AT1 at the start time $t_0$, and then advance to each next antenna once the modulation repetition has been sent. Thus, the antenna switch 28 switches in synchronism with the time compressor 22 to apply a complete waveform replica to each antenna element Ati.

Figures 2A, 2B, 2C, 2D:
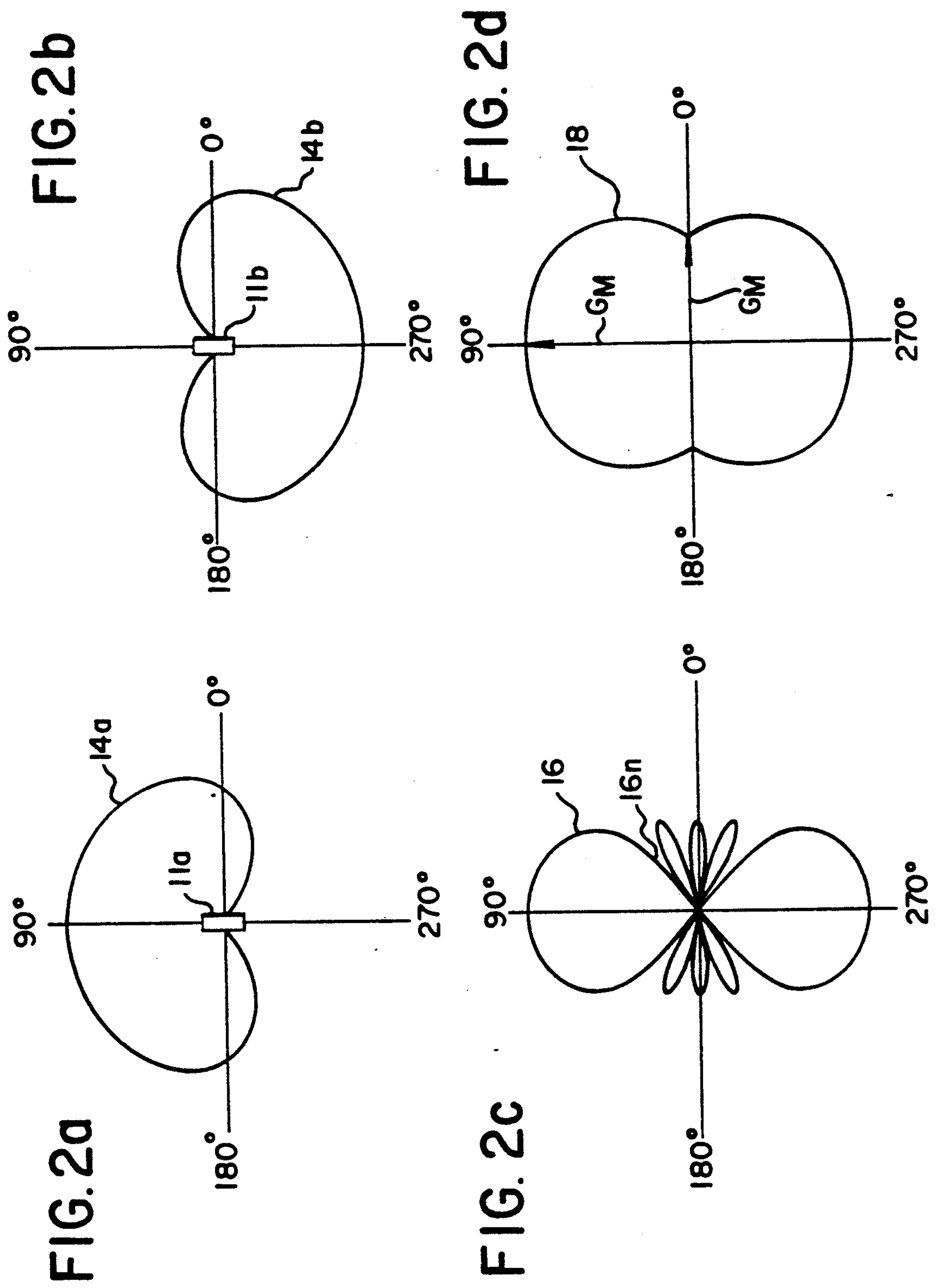
Figure 2E:
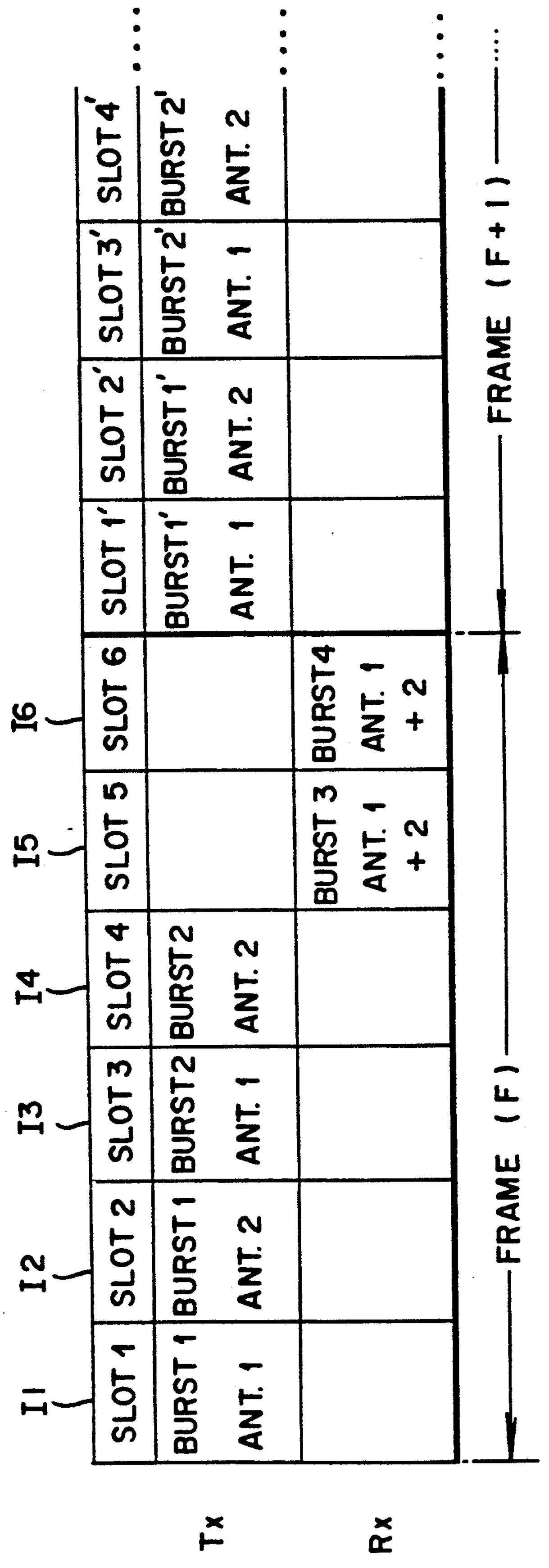
Figure 3A:
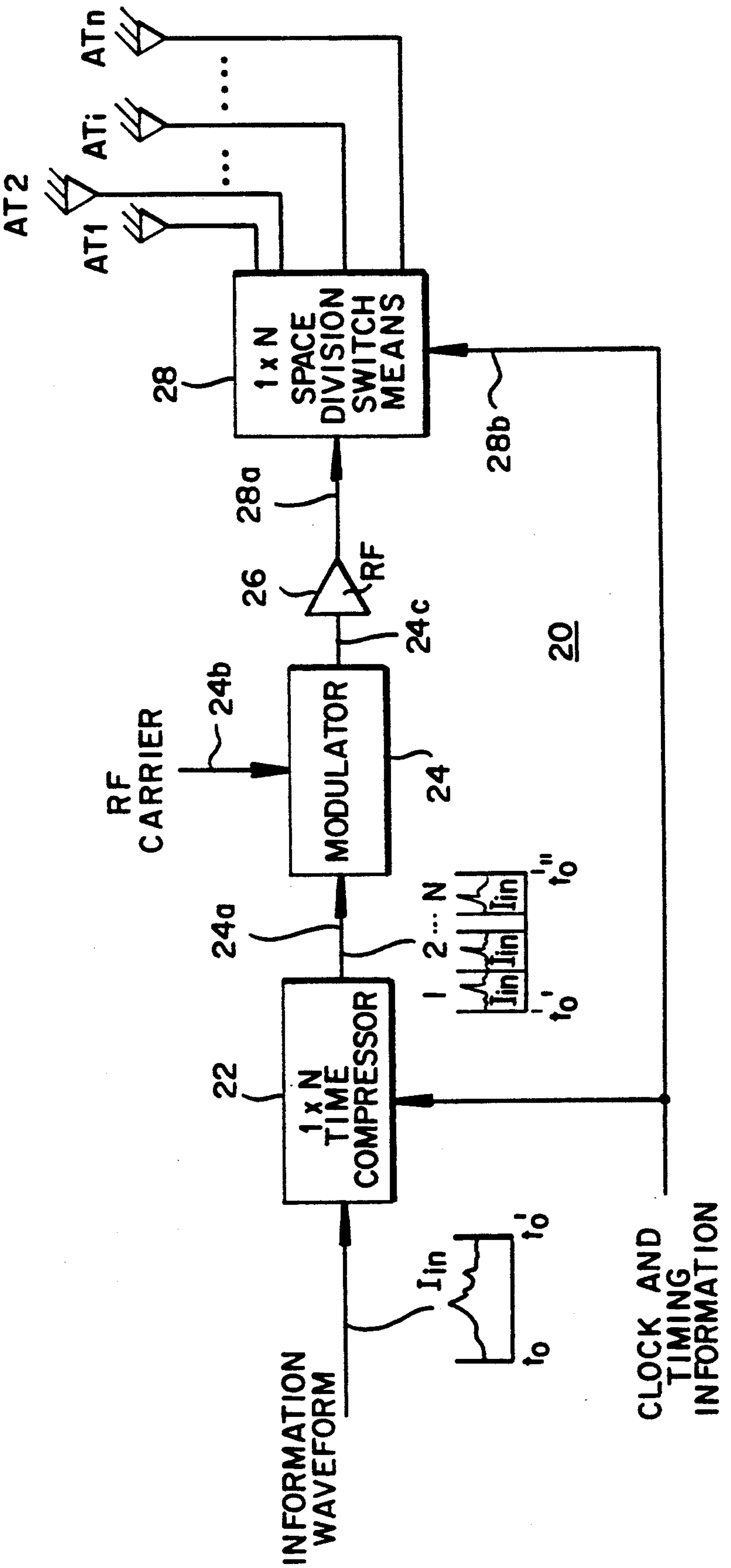
Figure 3B:
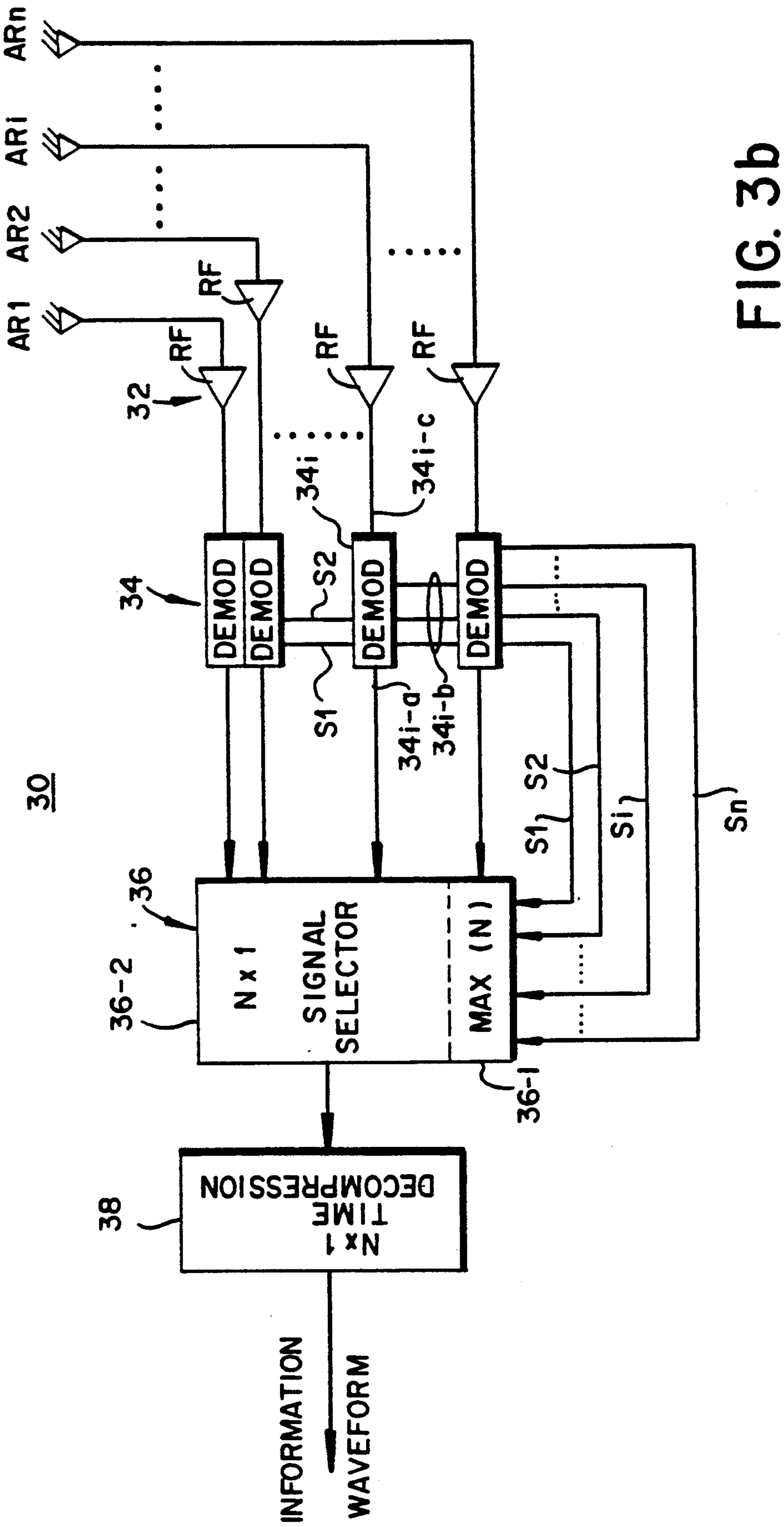

Referring to FIG. 3*b*, one embodiment of a master station receiver means 30 is shown for use in my novel spherical radiation pattern system. The omni-directional antenna receiving operation involves non-phase-coherent processing of the received information from each one ARi of the N individual antennae AR1-ARn. While a large number of options are available depending on the environment and the desired performance, a conceptually simplest receiver is shown for the situation diagrammed in FIG. 2*e*, i.e. the distant transmitter does not replicate its signal, so that the signal is transmitted only once, and the receiving antenna elements Ati are assumed to be the same as the transmitter antenna elements Ati and have a substantially spherical antenna pattern. The signal from each antenna element Ari can be considered in a separate channel and each channel signal is amplified by an associated one of a like number N of RF reception amplifiers 32*a*-32*n*, preferably having a low noise figure, prior to individual channel signal demodulation in a separate one 34*i* of a like plurality N of demodulator means 34*a*-34*n* selected for the form of modulation used in system transmission. Each demodulator not only provides its demodulated data at an output 34*i*-*a* but also provides a signal Si having a characteristic, e.g. magnitude, varying with the magnitude of the signal at the demodulator input 34*i*-*c*. Each of the input-strength signals Si is applied to a maximum-strength selector portion 36-1 of a N×1 signal selector means 36; the strongest one Ss of the strength signals S1-S*n* can be easily obtained by comparison and the like processes, and is used to route the demodulated data from the associated demodulator means 34*s*, where 1≦s≦n, through the selector section 36-2 (which may be a single-pole, N-throw switch having its single output connected to that one of the N inputs responsive to the control signal developed by the maximum-sensing portion 36-1). The single selected data waveform is provided to a time decompression means 38, which merely stretches the information signal to occupy N times the time interval, so as to reverse the 1/N time compression engendered by the transmitter time-compression means. It should be understood that while in this example the output signal is selected based on the largest signal strength received, other criteria can be equally as well used. Other variations can also be utilized; for one example, the distant station transmitter can replicate the transmitted information so that the output from each antenna could be processed in sequence by a single receiver and demodulator.

The forgoing techniques are equally as applicable to both half-duplex and full-duplex operation. In the case of full-duplex operation, frequency filters and/or circulators may be used to share the same antennas for transmit and receive. In the case of half-duplex operation, space division switching is used for antenna sharing.

FIG. 4 is a schematic block diagram of a specific embodiment of my spherical pattern antenna system, used with a Time Division Multiple Access (TDMA) communications protocol. TDMA is a good application for the omni-directional antenna since the functions of time compression and decompression are already incorporated. The illustrated main station TDMA transceiver 40 is shown for a timing scheme with a single information frame in which a base station communicates independently with two other sites, per the timing of FIG. 2*e*. In this particular example, N=2 antennae 11*a* and 11*b* are used, with each antenna having a hemispherical radiation pattern. A hemispherical pattern is well approximated by a quadrifilar helical antenna and its design is well known. The sum of the two individual patterns gives the relatively uniform pattern 18 of FIG. 2*d*, suitable for approximating the desired spherical pattern. Again examining the timing diagram of FIG. 2*e*, each TDMA transmission burst is transmitted twice: a first burst, in time slot I1, is transmitted from antenna number 1; a second burst of the same data is then transmitted from antenna number 2 in the next time slot I2. TDMA bursts received at the main station may be received by both antenna elements and, accordingly, are processed independently. The stronger of the two bursts is selected as the data output source. A variation of this technique is to intentionally provide overlapping antenna patterns from physically separated antenna elements. Multiple copies of the same signal both in transmission and reception result in a space-diversity type of reception. By use of diversity-combining or signal-selection techniques, significantly improved communications quality can be achieved in a fading environment.

Master station 40 includes a pair of independently-operable antenna switching means 42-1 and 42-2, configured to operate in non-overlapping manner, so that only one antenna 11 can be connected to a TDMA transmitter XMTR means 44 at any time; the transmitter sends out the input data temporarily stored in a transmit data buffer means 46, under control of a TDMA timing means 48. During reception time intervals, each of the pair of antennae is connected to the associated one of upper/channel #1 receiver means 50-1 or lower/channel #2 receiver means 50-2. Each channel receiver may be provided with suitable input protection means 52, such as an amplitude clipper and the like. Each receiver 50 provides output data to an associated time slot data buffer means 54-1 or 54-2 and also provides a signal-strength-indicating AGC1 or AGC2 signal to a first input 56-1*a* or 56-2*a* of an associated channel integrate-and-dump means 56-1 or 56-2.

The periodic dump D signal is provided at another output 48*b* of the TDMA timing means 48. The filtered AGC signal at the respective filter outputs 56-1*c* or 56-2*c* is coupled to the associated input 60*a* or 60*b* of a comparator amplifier 60; the state of the comparator output 60*c* signal is responsive to the larger of the two RF input signals. Thus, if the comparator output signal provided to an input 62*a* of a sample-and-hold means 62 is positive when a sample S signal, supplied at TDMA timing means output 48*c*, is coupled to a sample input 62*b*, then a first (+) output 62*c* is enabled, to provide a signal at a gating input 64-1*a* of a first clock switching means 64-1 and cause that switching means to allow clock pulses, originating at yet another TDMA timing means output 48*d*, to flow from clock switch output 64-1*c*, and cause the clocking out from channel 1 time slot buffer 54-1 of the upper channel data stored therein, because that channel had received the stronger signal and so has a lower error rate. Conversely, if the comparator output provides a negative-polarity signal to sample-and-hold means input 62*a* when the sample S signal is present at sample input 62*b*, then a second (−) output 62*d* is enabled, to provide a signal at a gating input 64-2*a* of another clock switching means 64-2 and cause clock pulses to clock stored data out from channel 2 time slot buffer 54-2, because the lower channel had received the stronger signal. The time slot buffer outputs are summed in means 66, so that received data output 40*a* contains the better data received during each pair of reception time slots.

While several presently preferred embodiments of my novel system for providing an antenna pattern of substantially spherical coverage have been described herein in detail, those skilled in the art will now realized that many modifications and variations can be provided within the spirit of the invention. Accordingly, I intend to be limited only by the scope of the appended claims and not by way of the details or instrumentalities set forth herein.

What I claim is:

1. A system for providing communication between at least one remote location positioned anywhere within a full sphere enclosing a master location above ground level, comprising in combination:

a master station affixed to a structure at said master location;

at least one remote station, each at a different one of the at least one remote location;

each of said master and remote stations operating with time domain multiple access (TDMA) operation; and a master station antenna system providing a substantially spherical radiation pattern about the structure located above ground level and upon which said master station is located, comprising: a plurality N of individual antennae, each having an individual radiation pattern covering only a portion of the desired sphere; means for locating each of the N different antennae at a different location on said structure, to generate an associated desired portion of the spherical pattern; and means, at said master station, for combining the plurality N of associated pattern portions into the desired substantially-spherical pattern to facilitate transmission of identical information through each one of said N antennae in each of a group of like plurality N of different time slots.

2. The system of claim 1, wherein each of the N antennae has a substantially hemispherical radiation pattern.

3. The system of claim 2, wherein the plurality of N antennae are comprised of at least one antenna pair, with each antenna of a pair being located to direct the radiation pattern thereof in a direction generally opposite to the direction of the radiation pattern of the other antenna of that pair.

4. The system of claim 3, wherein during RF transmission said combining means feeds RF energy to only one of each pair of antennae at any time.

5. The system of claim 3, wherein N=2.

6. The system of claim 2, wherein the plurality of N antennae are comprised of more than two antennae, with each antenna being located to direct the radiation pattern thereof in a direction different from the direction of the radiation pattern of the other antennae of the system.

7. The system of claim 1, wherein the plurality of N antennae are comprised of more than two antennae, with each antenna having both a radiation pattern of less than hemispherical coverage and a location selected to direct the radiation pattern thereof in a direction different from the direction of the radiation pattern of the other antennae of the system.

8. The system of claim 1, wherein the structure is a space platform.

9. The antenna system of claim 1, wherein the plurality N of group time slots sequentially follow one another.

10. The antenna system of claim 1, wherein the master station further transmits different information in each one of a sequential plurality of different groups of time slots.

11. The system of claim 10, wherein N=2, and the combining means at the master station includes means for (a) transmitting a first group of information first from the first one of said antennae and then from the remaining one of the antennae, and for then (b) transmitting a second group of information first from the first antenna and then from the remaining antenna.

12. The system of claim 1, wherein the combining means at said master station includes; a plurality N of separate receivers, each coupled to an associated one of the N antennae and each providing both a demodulated data signal and a magnitude signal responsive to the amplitude of the signal received by that receiver from its antennae; and means for providing as the master station received data output only the demodulated data from the receiver with the largest magnitude signal.

13. The system of claim 12, wherein N=2.

14. The system of claim 13 wherein during RF transmission said combining means feeds RF energy to only one antenna at any time.

15. The system of claim 14, wherein N is an even number and each of said antennae is assigned to only one antenna pair.

16. The system of claim 15, wherein N=2.

* * * * *

UNITED STATES PATENT AND TRADEMARK OFFICE

CERTIFICATE OF CORRECTION

PATENT NO. : 5,194,873

DATED : March 16, 1993

INVENTOR(S) : Louis Sickles II

It is certified that error appears in the above-indentified patent and that said Letters Patent is hereby corrected as shown below:

On the title page, item [54] and in column 1, lines 1 and 2, change the title to --COMMUNICATIONS SYSTEM WITH ANTENNA PROVIDING A SPHERICAL RADIATION PATTERN--.

Column 8, (claim 9) line 32, delete "antenna"; and
(claim 10) line 35, delete "antenna".

Signed and Sealed this

Thirtieth Day of November, 1993

Attest:

BRUCE LEHMAN

*Attesting Officer* — *Commissioner of Patents and Trademarks*